United States Patent
Moore et al.

(10) Patent No.: US 9,358,873 B2
(45) Date of Patent: Jun. 7, 2016

(54) VEHICLE TRANSMISSION SYSTEM AND VEHICLE DRIVE SYSTEM COMPRISING THE SAME

(75) Inventors: Adrian Paul Moore, Newbury (GB); Clive David Woolmer, Bognor Regis (GB); Christopher Guy Cholmeley, Thatcham (GB); Michael John Allen, Oxford (GB); Matthew Charles Clutterbuck, Newbury (GB); Paul Pomfret, Newbury (GB)

(73) Assignee: Xtrac Limited, Thatcham (GB)

( * ) Notice: Subject to any disclaimer, the term of this patent is extended or adjusted under 35 U.S.C. 154(b) by 152 days.

(21) Appl. No.: 14/131,053

(22) PCT Filed: Jul. 11, 2012

(86) PCT No.: PCT/GB2012/000586
§ 371 (c)(1),
(2), (4) Date: May 12, 2014

(87) PCT Pub. No.: WO2013/007972
PCT Pub. Date: Jan. 17, 2013

(65) Prior Publication Data
US 2014/0283646 A1    Sep. 25, 2014

(30) Foreign Application Priority Data

Jul. 11, 2011  (GB) ................................... 1111868.4
Feb. 3, 2012   (GB) ................................... 1201987.3

(51) Int. Cl.
*F16H 37/06*    (2006.01)
*B60K 6/547*    (2007.10)
(Continued)

(52) U.S. Cl.
CPC . *B60K 6/547* (2013.01); *B60K 6/36* (2013.01); *B60K 6/442* (2013.01); *B60K 6/48* (2013.01);
(Continued)

(58) Field of Classification Search
CPC .. B60K 6/48; B60K 2006/4825; F16H 3/089; F16H 59/02
USPC ................................................. 74/661, 665 B
See application file for complete search history.

(56) References Cited

U.S. PATENT DOCUMENTS 6,533,701 B2 * 3/2003 Maruyama ............... B60K 6/48
                                                        477/3
7,093,517 B2 * 8/2006 Hanyu ..................... B60K 6/36
                                                        475/5

(Continued)

FOREIGN PATENT DOCUMENTS

DE        101 36 725      2/2002
DE    10 2010 030 572    12/2011
(Continued)

OTHER PUBLICATIONS

International Search Report mailed Nov. 23, 2012 for International Application No. PCT/GB2012/000586.
(Continued)

*Primary Examiner* — Ha D Ho
(74) *Attorney, Agent, or Firm* — Fay Sharpe LLP

(57) ABSTRACT

A transmission system for a hybrid vehicle includes a primary input shaft for receiving drive from a primary vehicle drive motor, such as an internal combustion engine. A secondary input shaft receives drive from a secondary vehicle drive motor, such as an electric motor. An output shaft of the system is connected to drive a final drive unit. A multi-speed gearbox is provided to connect the primary input shaft to the output shaft at one of a plurality of gear ratios. An input selection mechanism, in a first mode, connects the secondary input shaft to drive the output shaft and, in a second mode, connects the secondary input shaft to drive the primary input shaft. A clutch may be provided that can selectively connect or disconnect drive between the primary drive motor and the gearbox.

21 Claims, 14 Drawing Sheets

(51) Int. Cl.
*F16H 3/089* (2006.01)
*B60K 6/48* (2007.10)
*B60K 6/36* (2007.10)
*B60K 6/442* (2007.10)

(52) U.S. Cl.
CPC ........ *F16H 3/089* (2013.01); *B60K 2006/4808* (2013.01); *B60K 2006/4825* (2013.01); *F16H 2200/0021* (2013.01); *F16H 2200/0056* (2013.01); *Y02T 10/626* (2013.01); *Y02T 10/6221* (2013.01); *Y02T 10/6252* (2013.01); *Y10S 903/902* (2013.01); *Y10T 74/19014* (2015.01)

(56) References Cited

U.S. PATENT DOCUMENTS

| | | | |
|---|---|---|---|
| 8,635,923 B2 * | 1/2014 | Misu | B60K 6/547 74/325 |
| 8,931,371 B2 * | 1/2015 | Xie | B60K 6/48 74/665 A |
| 2002/0033059 A1 | 3/2002 | Pels et al. | |
| 2002/0040818 A1 | 4/2002 | Maruyama | |
| 2005/0032598 A1 | 2/2005 | Hanyu et al. | |
| 2005/0279543 A1 | 12/2005 | Seufert et al. | |
| 2010/0311540 A1 | 12/2010 | Hellenbroich | |

FOREIGN PATENT DOCUMENTS

| | | |
|---|---|---|
| EP | 1 504 946 | 2/2005 |
| EP | 2 447 571 | 5/2012 |
| EP | 2 505 408 | 10/2012 |
| FR | 2 835 301 | 8/2003 |
| GB | 2 451 246 | 1/2009 |
| JP | 2002 114063 | 4/2002 |
| JP | 2010-162924 | 7/2010 |
| WO | WO 98/40647 | 9/1998 |
| WO | WO 2011/064986 | 6/2011 |

OTHER PUBLICATIONS

British Search Report dated Jun. 1, 2012 for Application No. GB1201987.3.

* cited by examiner

Optional EM disconnect clutch

VEHICLE TRANSMISSION SYSTEM AND VEHICLE DRIVE SYSTEM COMPRISING THE SAME

This invention relates to a vehicle transmission system. In particular, it relates to a transmission system for a vehicle that can be driven by more than one prime mover, most typically, an internal combustion engine and an electric motor.

The aim of reducing emissions has driven the introduction of vehicles that are driven by electric motors. Vehicles that are powered exclusively by electricity have met with some acceptance for use in urban areas, where journeys are typically short and speeds are low. However, the amount of energy that can be stored using present-day battery technology, and the length of time taken to recharge their batteries, mean that such vehicles are of limited use for long distance travel.

To overcome the limitations of exclusively electrically-driven vehicles, hybrid vehicles have been developed. Such vehicles have both an internal combustion engine (IC engine)—typically a spark-ignition petrol, biofuel or gas engine, but potentially a compression-ignition diesel engine—and an electric motor. In the configuration known as "parallel hybrid", the IC engine and the electric motor can be used alternatively or together to drive the vehicle. When a hybrid vehicle is to be decelerated, the electric motor can be used to convert kinetic energy of the vehicle to electrical energy to charge a battery pack, instead of simply converting it to waste heat in the braking system.

A disadvantage with the parallel hybrid arrangement is that the transmission system that delivers drive between the prime movers and the driving wheels is more complex than is required for a vehicle that has exclusively electrical or exclusively IC engine power. This adds to the weight of the vehicle, so compromising its efficiency and handling, and also adds to cost and potential sources of unreliability. Another consequence of this arrangement is that the electric motor may frequently be required to operate out of its ideal speed range, leading to poor efficiency and/or performance.

An aim of this invention is to provide a transmission system for vehicle that improves upon those already available.

To this end, the present invention provides a transmission system the system comprising:
 a. a primary input shaft for receiving drive from a primary vehicle drive motor,
 b. a secondary input shaft for receiving drive from a secondary vehicle drive motor;
 c. an output shaft for connection to drive a final drive unit;
 d. a multi-speed gearbox that can connect the primary input shaft to the output shaft at one of a plurality of gear ratios; and
 e. input selection means;
 in which the input selection means, in a first configuration, connects the secondary input shaft to drive the output shaft and, in a second mode, connects the secondary input shaft to drive the primary input shaft.

It will be noted that, in the first mode, the speed of the motor is proportional to the speed of the output, and therefore the speed of a vehicle in which the transmission is operating, while in the second mode, it is proportional to the speed of the primary drive.

The input selection means may operate by selectively connecting drive from the secondary input shaft to a first or a second gear train within the gearbox, each train having a gear on a mainshaft of the gearbox and a gear on a layshaft of the gearbox. In such embodiments, the first gear train is permanently connected for rotation with the mainshaft of the gearbox and the second gear train is permanently connected for rotation with the layshaft of the gearbox.

Drive may be taken from the secondary input shaft direct to a gear train. In such embodiments, the input selection means operates by selectively connecting drive from the secondary input shaft to a gear train within the gearbox or to a layshaft (or alternatively a mainshaft) of the gearbox, the train having a gear on a mainshaft of the gearbox and a gear on the layshaft of the gearbox. In such embodiments, each gear of the gear train can typically be selectively connected to or disconnected from its shaft of the gearbox, in contrast to a conventional gearbox in which just one or other gear in a train can be selectively connected to or disconnected from its shaft.

In an alternative arrangement, drive from the secondary input shaft is passed to a through gear, which can be selectively connected to a mainshaft (or alternatively a layshaft) of the gearbox or to a mainshaft gear (or alternatively a layshaft gear) of a gear train of the gearbox.

A transmission system embodying the invention may further include a clutch that can selectively connect the primary input shaft to the gearbox or disconnect the primary input shaft from the gearbox. This allows the vehicle to be driven using the secondary drive motor only, independently of the primary drive motor, which can be stopped, or operated to charge a vehicle battery.

A transmission system may operate with the selection means in the first configuration when the gearbox is in neutral or in a low ratio, and in the second configuration when the gearbox is in a high ratio. For example, it may operate in the first configuration in neutral, $1^{st}$, $2^{nd}$ or $3^{rd}$ gear, and in the second configuration in higher gears.

From a second aspect, the invention provides a drive system for a vehicle, the drive system comprising a transmission system embodying the first aspect of the invention, a primary drive motor connected to the primary input shaft, and a secondary drive motor connected to the secondary input shaft.

In a typical embodiment, the primary drive is an internal combustion engine. The internal combustion engine may be substantially any engine applicable to vehicles of the type with which the drive system is intended for use. For example, it may be a compression ignition engine or a spark ignition engine.

The secondary drive motor is typically an electric motor. In such cases, the drive system typically includes a battery pack and charging means for the battery pack.

The drive system most preferably can, during such time that there is no drive connection from the primary drive motor to the output shaft (for example, when the gearbox is in neutral or is disconnected from the primary input shaft by the clutch), connect the primary drive motor to the charging means to cause it to charge the battery pack.

Embodiments of the invention will now be described in detail, by way of example, and with reference to the accompanying drawings, in which.

Figure 1:
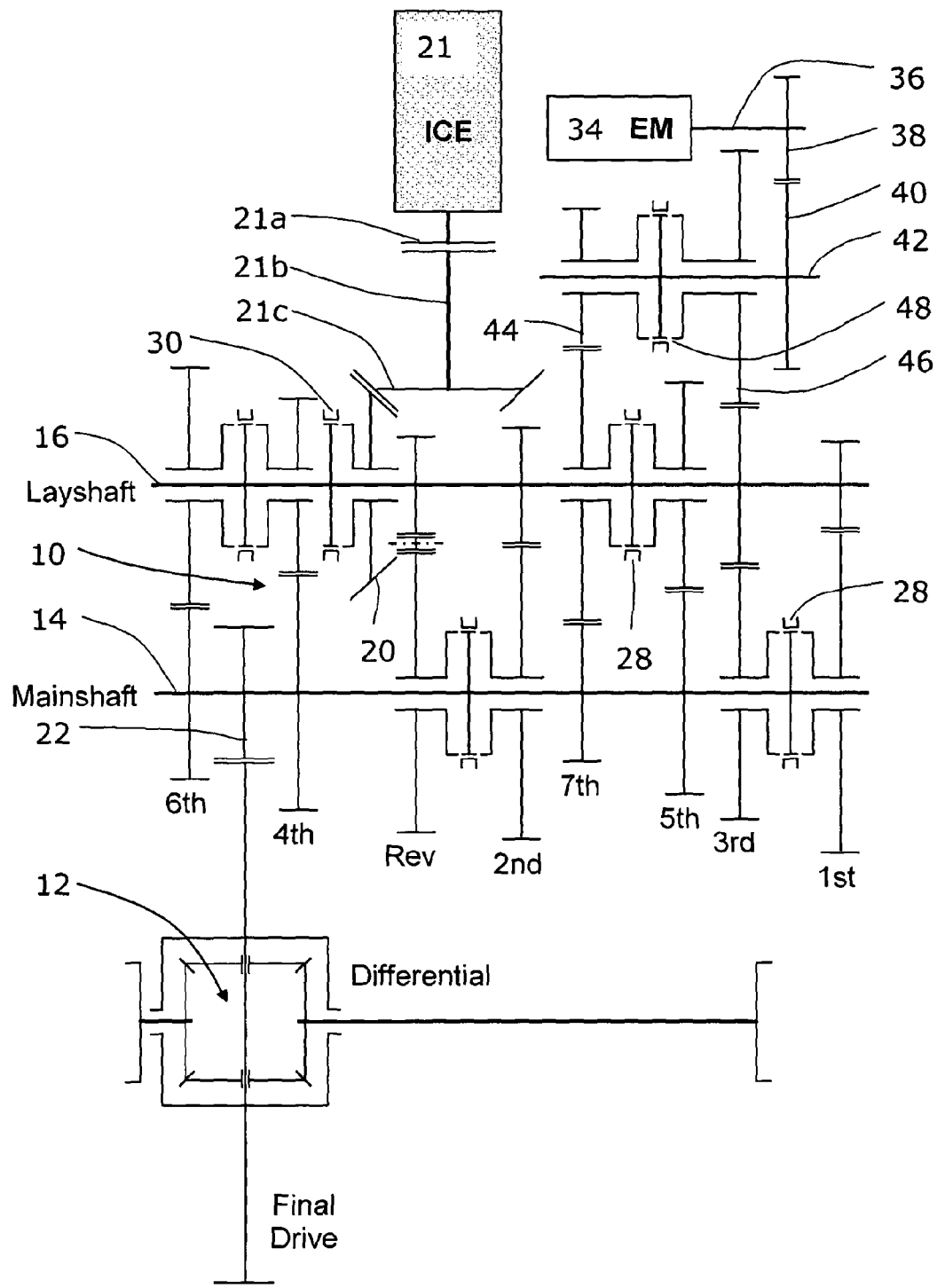
FIG. 1 shows diagrammatically the main components of a transmission system being a first embodiment of the invention.

With reference first to FIG. 1, this embodiment of the invention is based upon a 7-speed automated manual transmission (AMT). As is known to those in the technical field, such a transmission includes a gearbox 10 and a final drive unit 12. The gearbox has a mainshaft 14 and a layshaft 16. The layshaft 16 carries an input bevel 20 that is connected to an IC engine 21 (which is the primary drive for the vehicle) through a clutch 21a, a drive shaft 21b and a drive bevel 21c. In this embodiment the mainshaft 14 comprises an output shaft and carries an output spur gear 22 which is connected to the final drive unit 12.

The gearbox 10 contains a plurality of meshing trains of two gears, labelled $1^{st}$ to $7^{th}$ and Rev in the figures. One such train is provided for each forward speed, with pairs $1^{st}$ to $7^{th}$ providing a successively higher drive ratio, and Rev providing reverse drive. A greater or lesser number of trains may be present in other embodiments. For each gear train, one of the gears is constrained to rotate with either the mainshaft 14 or the layshaft 16, while the other of the gears can be connected to or disconnected from the other of the mainshaft 14 or the layshaft 16 by engagement or disengagement of a selector 28. In this embodiment, the selector for $3^{rd}$ gear is on the mainshaft 14 and the selector for $7^{th}$ gear is on the layshaft 16. At any time, no more than one gear train has its selector engaged. When no selector 28 is engaged, the gearbox is in neutral, and no drive is transmitted from the input bevel 20 to the output spur gear 22.

To the extent so far described, the transmission system is conventional in construction and operation. It should also be noted that the above arrangement is just one of many to which the present invention can be applied. For example, in this embodiment the input is through a bevel gear, but it could equally be through an input spur gear or directly into the layshaft as shown in the examples in FIGS. 11-13. Likewise, the output is from a spur gear on the mainshaft, but could be a bevel gear or by direct connection.

The gearbox 10 differs from a conventional gearbox in that the input bevel gear 20 can be selectively connected to the layshaft 16 such that they are constrained to rotate together, or it can be disconnected from the layshaft 16 such that the input bevel gear 20 can rotate upon the layshaft 16. In this embodiment, this is achieved by providing a selector clutch 30 that operates in association with the input bevel gear 20 in much the same way as the selectors 28 for the gear trains.

In addition to the IC engine 21, a vehicle in which the transmission system is installed has an electric secondary drive motor 34. An output shaft 36 of the motor 34 carries a spur gear 38 which is in mesh with an input spur gear 40 of the transmission system. The input spur gear 40 is carried on and fixed for rotation with an idler shaft 42. Also carried on the idler shaft are a smaller spur gear 44, a larger spur gear 46, and a selector 48 that can couple one or other of the smaller and larger spur gears 44, 46 to the idler shaft 42 for rotation with it. Each of the smaller and larger spur gears 44, 46 is in mesh with a respective gear on the layshaft 16. The smaller spur gear 44 is in mesh with a gear of the $7^{th}$ speed gear train, while the larger spur gear 46 is in mesh with a gear of the $3^{rd}$ speed gear train.

Operation of the transmission system will now be described with reference to FIGS. 2 to 4, which illustrate schematically a transmission system similar to that shown in FIG. 1, except that the secondary drive idler shaft spur gears 44, 46 mesh with a respective gear on the mainshaft (rather than layshaft) and the locations of some of the selectors on the layshaft and the gearbox are reversed. Consequentially, spur gear 44 is of a larger size than spur gear 46 in this arrangement.

In FIGS. 2 to 10 the convention is used that a selector that is connected is shown with hatching, while a selector that is disconnected is shown plain. The components in the active torque path between electric motor 34 and gearbox 10 are also shown in bold in each figure.

Figure 2:
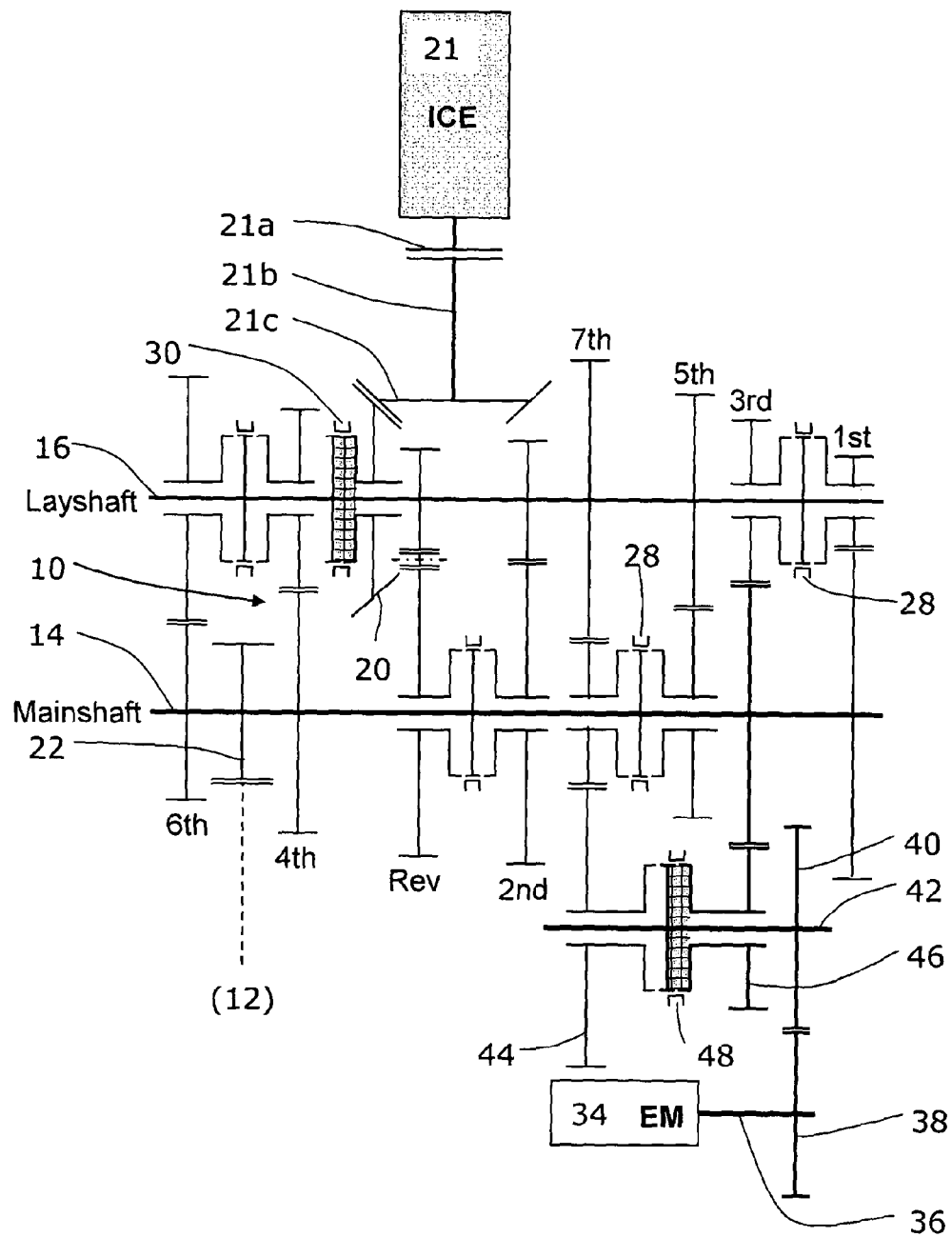
FIG. 2 shows diagrammatically the main components of a transmission system being a second embodiment of the invention in a first mode of operation.

With reference first to FIG. 2, in a first mode of operation, the selector 48 is moved on the idler shaft 42 to select the smaller spur gear 46. The idler shaft and gear pair 38 and 40 are shown in this example: they are not essential for the correct functioning of the system as the electric motor could be connected directly to the idler shaft 42. This has the effect of connecting the electric motor 34 to the $3^{rd}$ gear train, and hence to the mainshaft 14. Generally, the transmission system is configured to adopt this first mode of operation when the gearbox is in a low gear ratio or in neutral, and the second mode of operation when the gearbox is in a high gear ratio. Therefore, while the vehicle (which is being driven by the IC engine primary drive) is in $1^{st}$ to $3^{rd}$ gears the secondary electric motor 34 is directly driving the mainshaft 14, thereby assisting the gearbox output. The gearing of the gear train of the electric motor 34 when operating in this mode is such that the speed range of the electric motor 34 is matched to the speed range of the mainshaft 14 from $1^{st}$ to $3^{rd}$ gear. In this first mode of operation, the electric motor 34 can maintain drive to the final drive while the transmission is disconnected from the IC engine by opening the clutch to perform a gear change. This improves the smoothness of operation of the vehicle by reducing the effect of the sudden loss of drive during a speed change using a conventional gearbox, and improves the performance of the vehicle.

Figure 3:
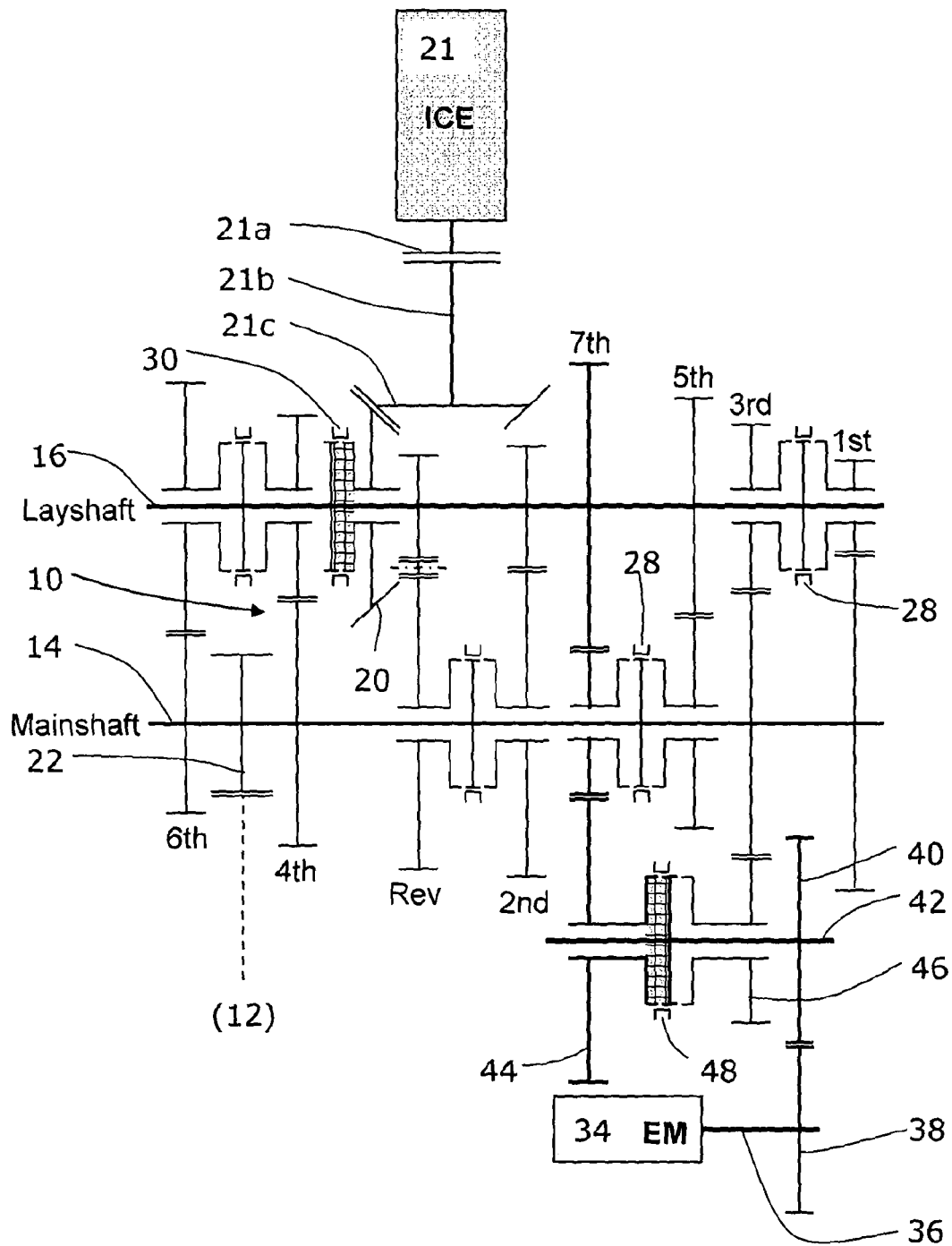
FIG. 3 shows diagrammatically the main components of the transmission system of FIG. 2 in a second mode of operation.

When the vehicle speed has increased to a rate at which is required to change into 4th gear, the transmission system is configured to adopt the second mode of operation in which the selector 48 is moved on the idler shaft 42 to select the larger spur gear 44, as shown in FIG. 3. Drive from the electric motor 34 is therefore diverted to the 7th gear train and therefore to the layshaft 16. The electric motor is now assisting the gearbox input. The gearing of the gear train of the electric motor 34 when operating in this $2^{nd}$ mode is such that the speed range of the electric motor 34 is matched to the speed range of the layshaft 16, hence to that of the IC engine. In this mode of operation, the electric motor 34 can maintain rotation of the internal components of the gearbox while it is disconnected from the IC engine during a gear change, thereby helping the gearbox to remain synchronised with the IC engine until the clutch is re-engaged, giving the perception of a smoother gear change.

When electric motor 34 is connected through the $3^{rd}$ gear train to the mainshaft 14, the vehicle can operate in a pure electric mode with the IC engine turned off. To achieve this, the gearbox 10 is placed in neutral, such that the layshaft 16 and therefore the IC engine is not being rotated by the transmission, and the conventional vehicle clutch need not be opened.

Figure 4:
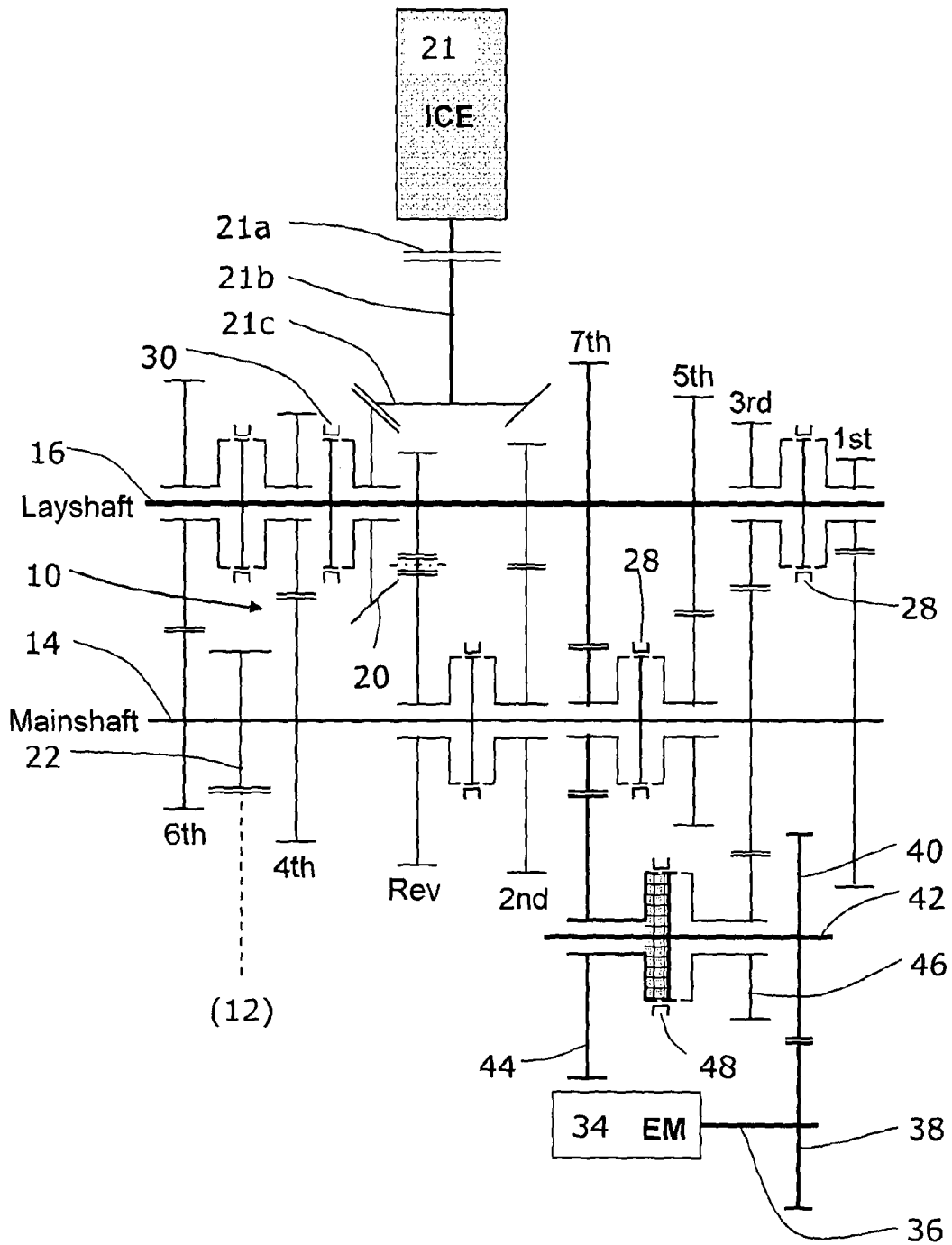
FIG. 4 shows diagrammatically the main components of the transmission system of FIG. 2 in a third mode of operation.

Alternatively, the selector clutch 30 may be operated to completely disconnect the IC engine from the gearbox and allow an extended speed range of pure electric operation using the $7^{th}$ gear train to connect the electric motor 34 to the layshaft 16, as shown in FIG. 4. In this $3^{rd}$ mode of operation, the complete disconnection of the IC engine ensures that when the vehicle is operating in electric mode only, the IC engine is not being rotated by the transmission, and the conventional vehicle clutch need not be opened. This ensures a minimum number of gear meshes to ensure maximum drive line efficiency.

In this $3^{rd}$ mode of operation, the IC engine can be operated independently of the electric motor 34. Thus, the IC engine can be used to drive an (engine mounted) generator to charge the vehicle battery pack, thereby allowing the vehicle to operate in a range extender mode.

It has been found that embodiments of the invention can have a shift quality that compares favourably with a dual clutch transmission or an automatic transmission, but without the weight and complexity of such systems. Embodiments of the invention can also provide improved performance and efficiency as compared to existing systems.

The embodiment can provide an advantageously compact transmission, which is short in length when used in a transverse configuration, and which has a low centre of gravity.

A simplified embodiment of the invention will be described with reference to FIGS. 5 to 7.

As has been discussed above, it is normal for each gear train to have one gear that is permanently secured for rotation with its shaft, while the other gear can rotate upon its shaft until it is selected by coupling it to its shaft. In the above arrangement, $3^{rd}$ gear is selected by connecting the layshaft $3^{rd}$ gear to the layshaft 16, while the mainshaft $3^{rd}$ gear is permanently connected to the mainshaft 14. Thus, layshaft $3^{rd}$ gear has an associated selector hub. In the embodiment of FIGS. 5 to 7, both the $3^{rd}$ gear layshaft gear and the $3^{rd}$ gear mainshaft gear are connected to their respective shafts by a selector 28, 28'. This allows the input spur gear 40 to be connected directly to (in mesh with) the layshaft gear of the $3^{rd}$ gear train.

Figure 5:
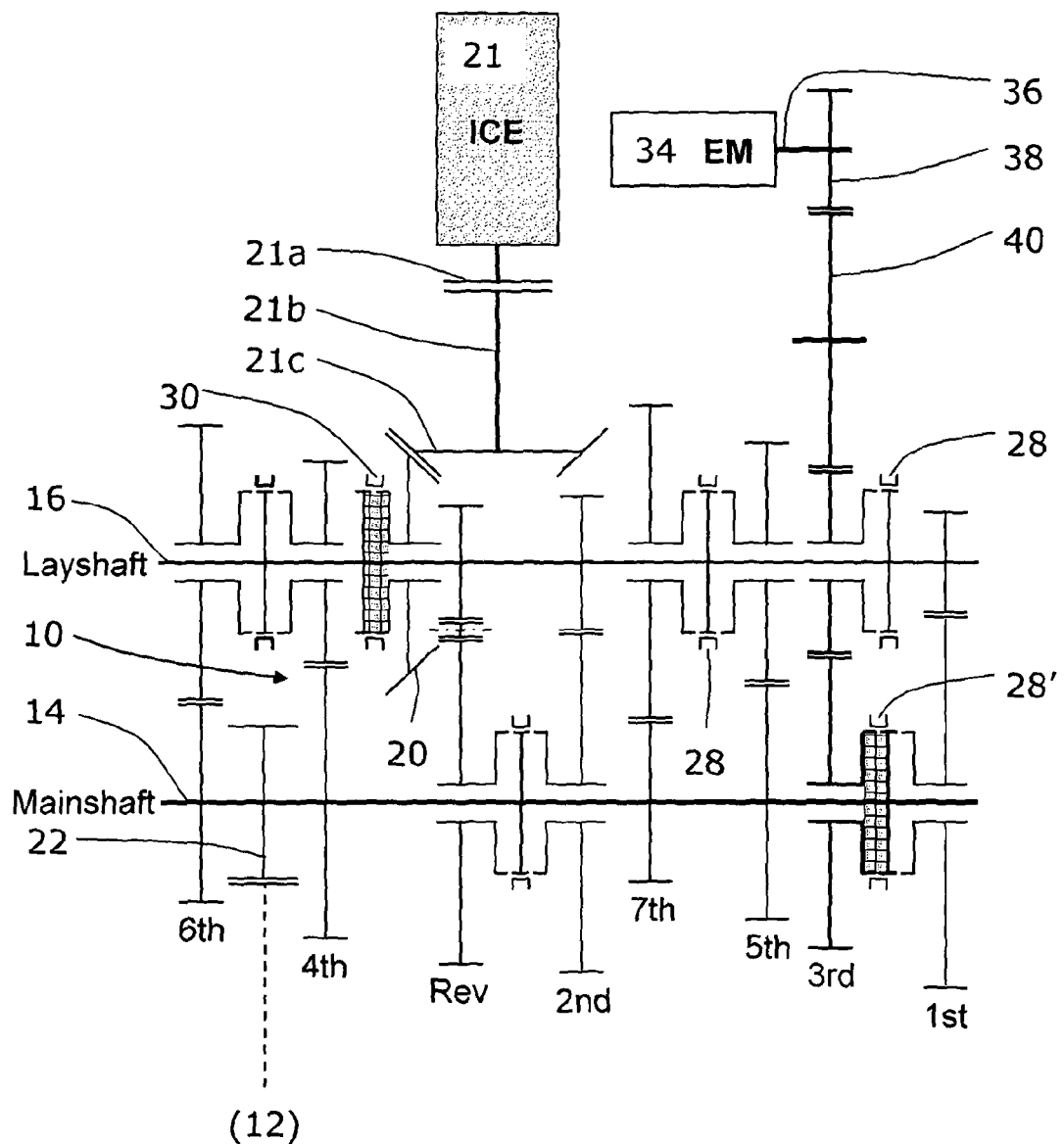
FIG. 5 shows diagrammatically the main components of a transmission system being a third embodiment of the invention in a first mode of operation.

FIG. 5 shows that if the $3^{rd}$ gear train layshaft gear is disconnected from the layshaft 16 and $3^{rd}$ gear train mainshaft gear is connected to the mainshaft 14, the electric motor 34 is connected directly to the mainshaft 14, and hence is assisting the gearbox output.

Figure 6:
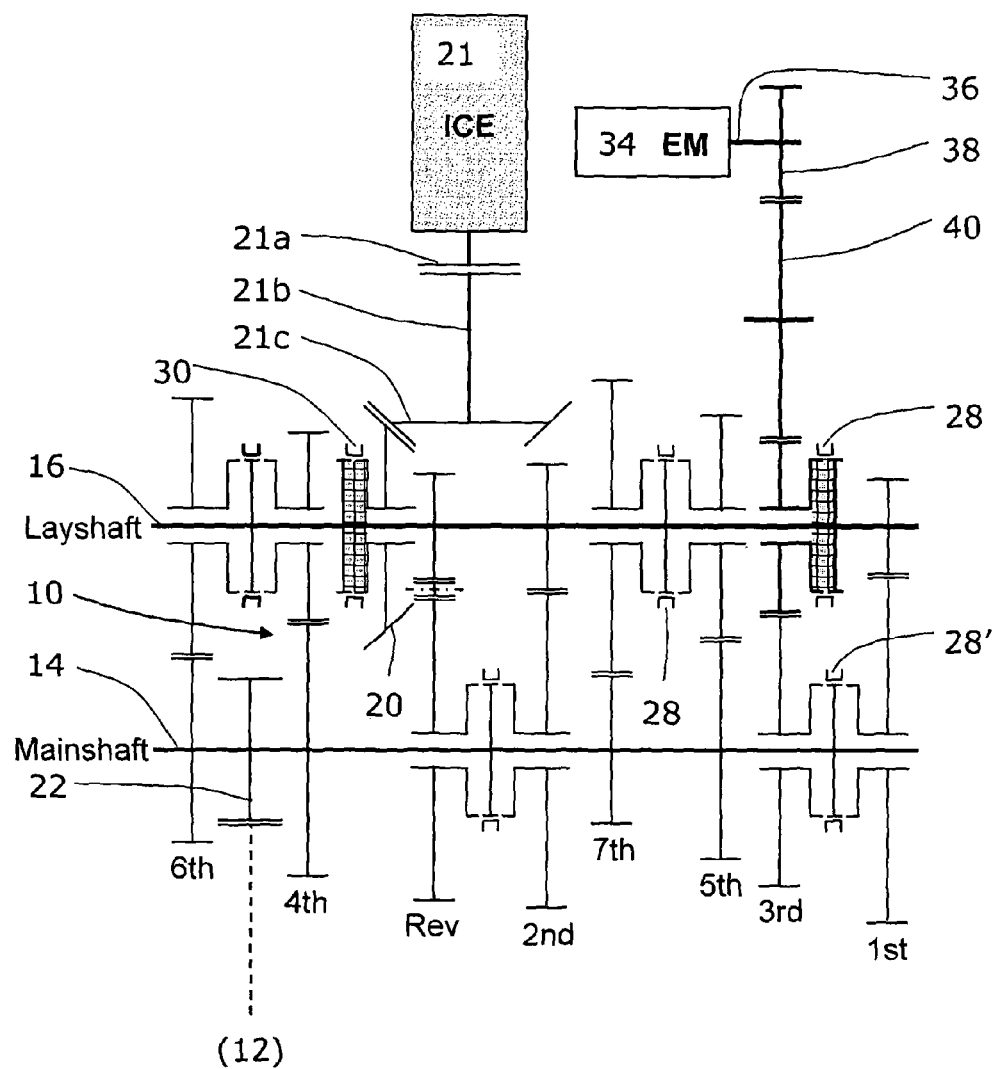
FIG. 6 shows diagrammatically the main components of the transmission of FIG. 5 in a second mode of operation.
Figure 7:
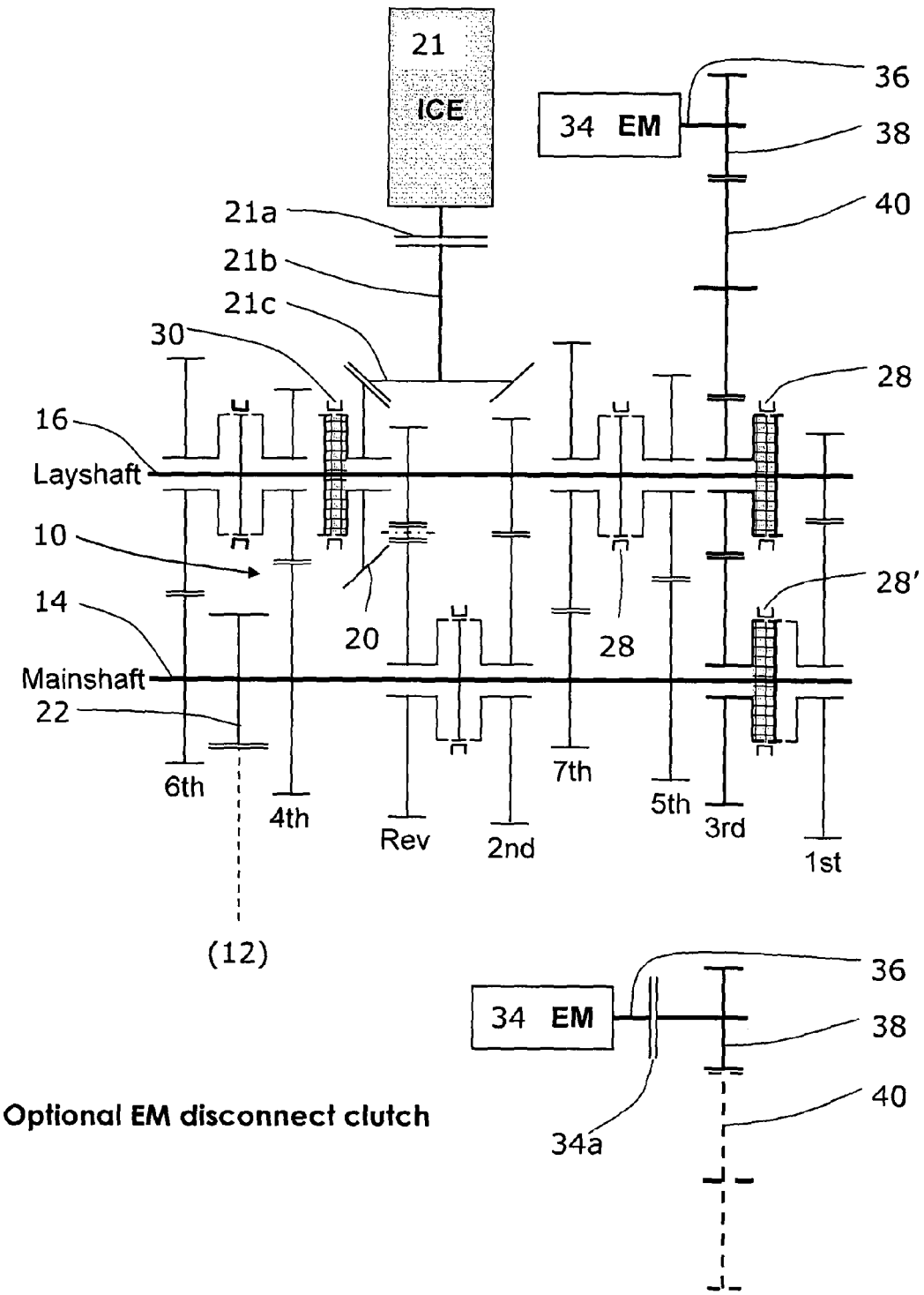
FIG. 7 shows diagrammatically the main components of the transmission of FIG. 5 in a third mode of operation.

FIG. 6 shows that by connecting the layshaft gear of the $3^{rd}$ gear train to the layshaft 16 and disconnecting the $3^{rd}$ gear train mainshaft gear from the mainshaft 14, the electric motor 34 is assisting the gearbox input by connecting the electric motor 34 directly to the layshaft 16.

When the vehicle is to be driven in $3^{rd}$ gear, the $3^{rd}$ gear train is connected to both the layshaft 16 and the mainshaft 14 to allow the IC engine to drive the vehicle conventionally, and the electric motor 34 to assist the gearbox output. This arrangement is shown in FIG. 7.

Although the electric motor 34 in this example drives $3^{rd}$ gear, it could alternatively drive any of the other gears, for example $1^{st}$ or $2^{nd}$ gear. Moreover, a multitude of secondary drive motors could also be used to drive more than one of the gear trains, for example $3^{rd}$ gear and $7^{th}$ gear, to increase the operating envelope of the secondary drive system. The input spur gear 40 may mesh with either the layshaft gear of the chosen gear train, as this example, or with the mainshaft gear of the chosen gear train, depending on package requirements. Furthermore, the input spur gear 40 is not essential for correct functioning of the system and may be omitted if the transmission package allows spur gear 38 on the motor output shaft to mesh directly with the chosen gear train at the desired ratio.

Additionally, as in the previous embodiments, the IC engine can be operated independently of the or each secondary drive motor, to provide a drive for a generator, that is provided in conjunction with a vehicle battery pack to provide a range extender mode to the vehicle.

With this example in particular, a separate disconnect clutch 34a may be optionally fitted on the electric motor drive shaft 36, to allow the secondary drive motor to be decoupled from the $3^{rd}$ gear train in the event of the electric motor needing to be disabled. This arrangement is also shown in FIG. 7.

Figure 8:
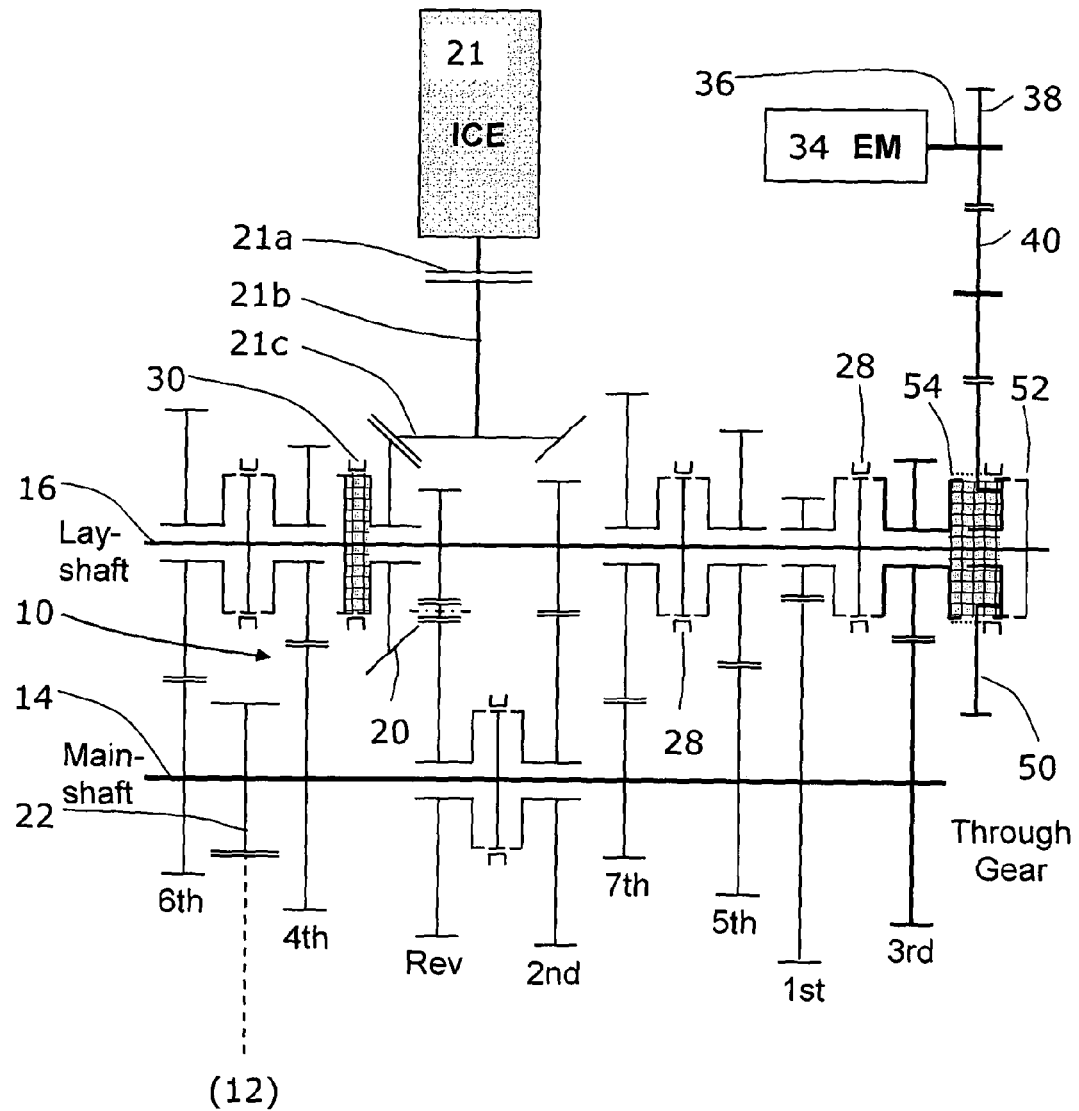
FIG. 8 shows diagrammatically the main components of a transmission system being a fourth embodiment of the invention in a first mode of operation.
Figure 9:
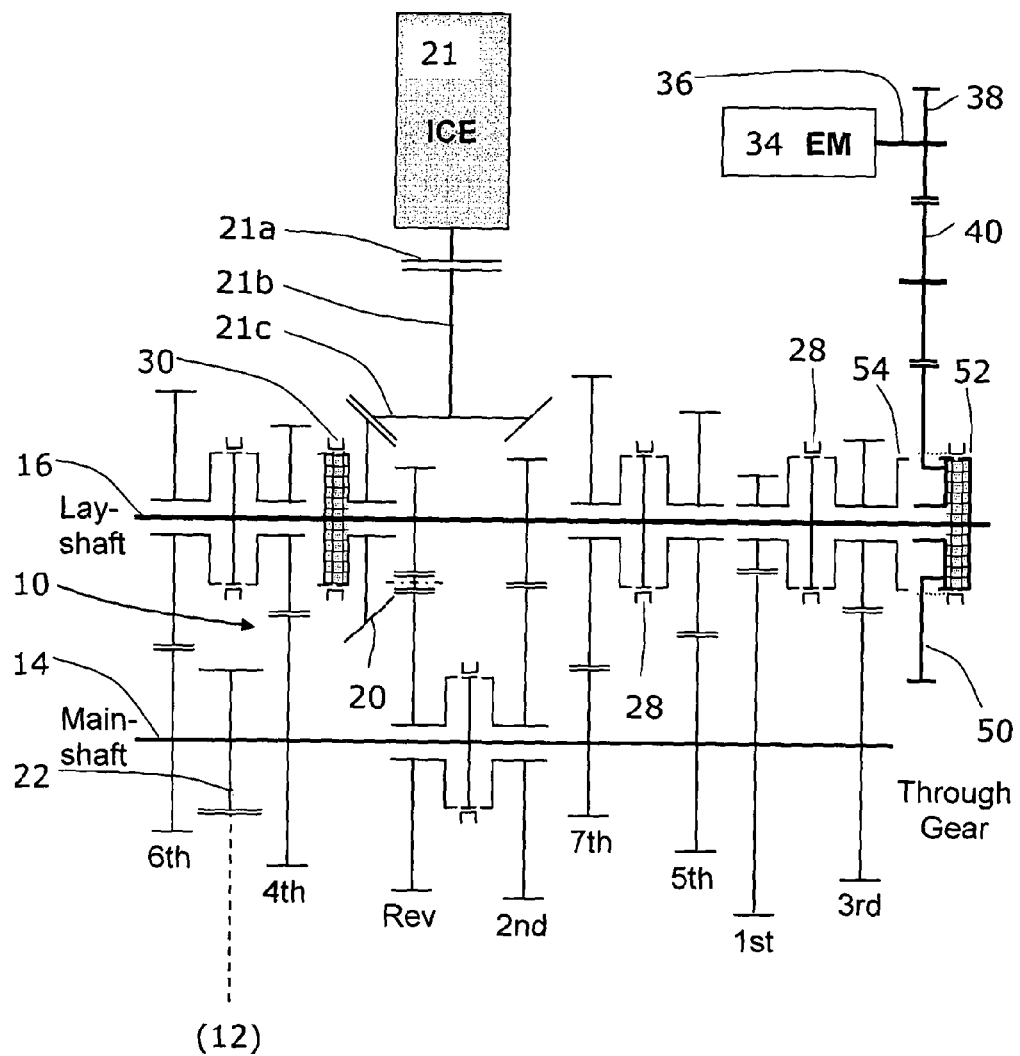
FIG. 9 shows diagrammatically the main components of the transmission of FIG. 8 in a second mode of operation.
Figure 10:
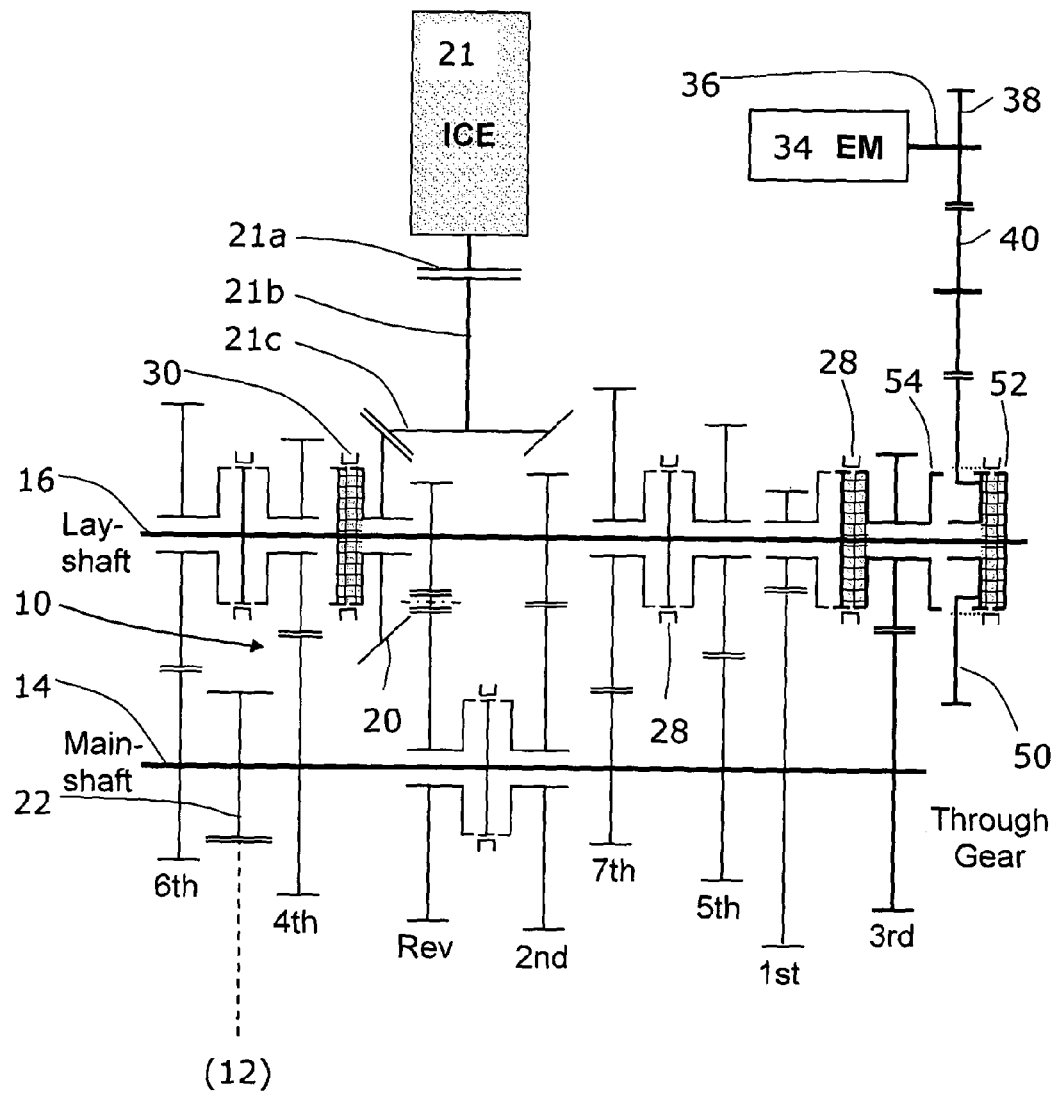
FIG. 10 shows diagrammatically the main components of the transmission of FIG. 8 in a third mode of operation.

With reference now to FIGS. 8 to 10, a fourth embodiment of the invention will be described. In this embodiment, the electric motor 34 is connected to the gearbox 10 by a through gear 50. The through gear is shown in mesh with an idler gear 40 between it and the spur gear 38 on the shaft 36 of the motor 34, although an idler gear is not essential for the correct functioning of the system. The through gear 50 is on one end of the layshaft 16 in this example. However, it could be incorporated at any point along the shaft length. A first selector 52 allows the through gear 50 to be connected to or disconnected from the layshaft 16, and a second selector 54 allows the through gear 50 to be connected to or disconnected from the layshaft gear of the $3^{rd}$ gear train. Selectors 52 and 54 may be independent devices or linked together as shown in this example.

In the configuration shown in FIG. 8, the through gear 50 is connected through the second selector 54 to the layshaft gear of the $3^{rd}$ gear train. (Gears other than $3^{rd}$ could be used alternatively.) The layshaft gear of the $3^{rd}$ gear train is not connected to the layshaft by its selector, but the mainshaft gear of the $3^{rd}$ gear train is permanently connected to the mainshaft 14. In this configuration, the electric motor 34 can assist the gearbox output.

In the configuration shown in FIG. 9, the electric motor 34 transmits drive to the gearbox 10 by the through gear 50. The first selector 52 connects the through gear 50 to the layshaft 16 and the second selector 54 is disconnected. In this configuration, the electric motor 34 can assist the gearbox input.

FIG. 10 shows a similar situation to that of FIG. 9, but additionally the gearbox is in $3^{rd}$ gear, so the layshaft gear of the $3^{rd}$ gear train is connected to the layshaft by its selector 28. Therefore, the electric motor 34 is connected to both the layshaft 16 and mainshaft 14.

Figure 11:
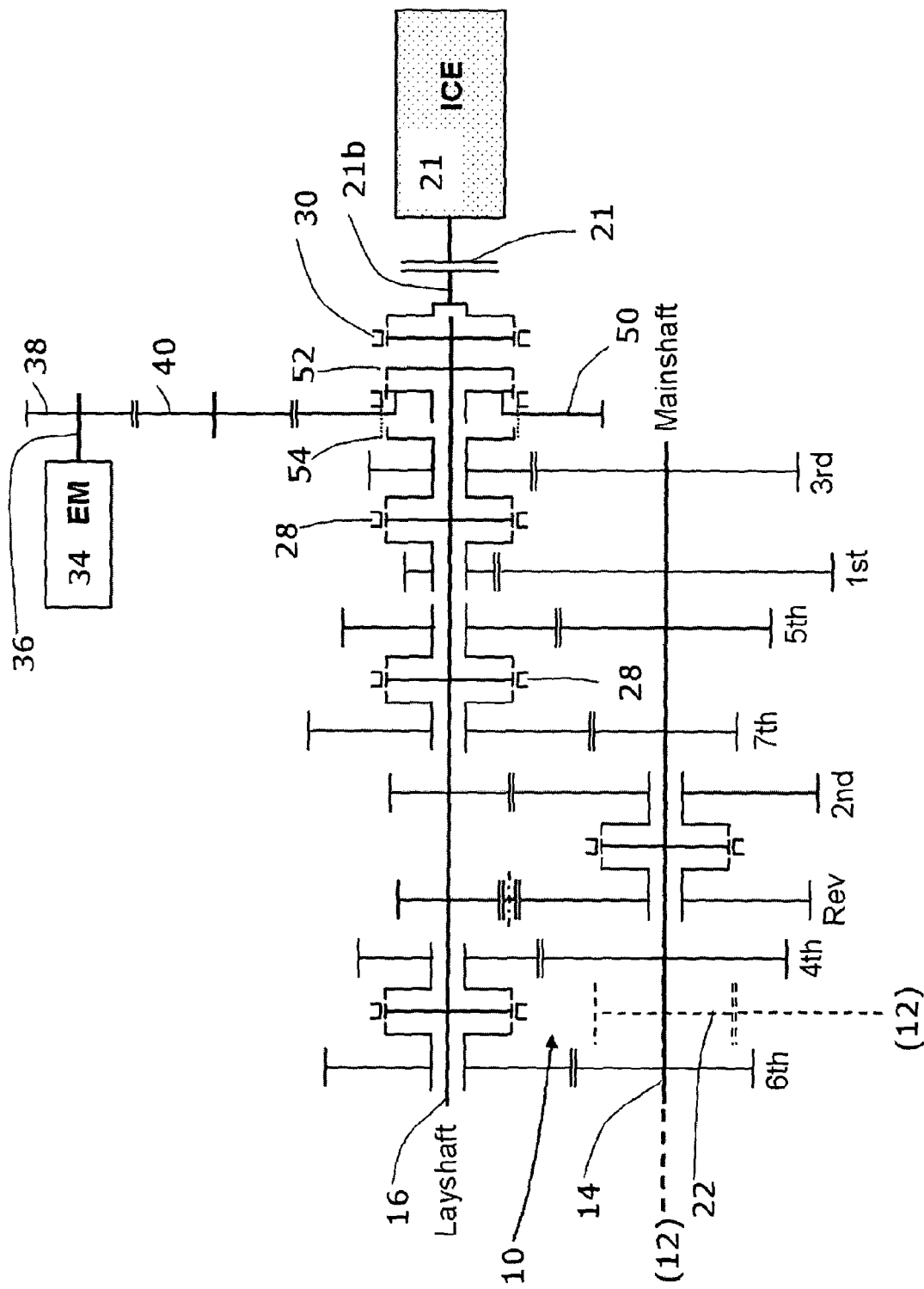
FIGS. 11 & 12 show diagrammatically the main components of two alternative transmission architectures utilising the same hybrid functionality as the fourth embodiment of the invention in FIGS. 8-10.
Figure 12:
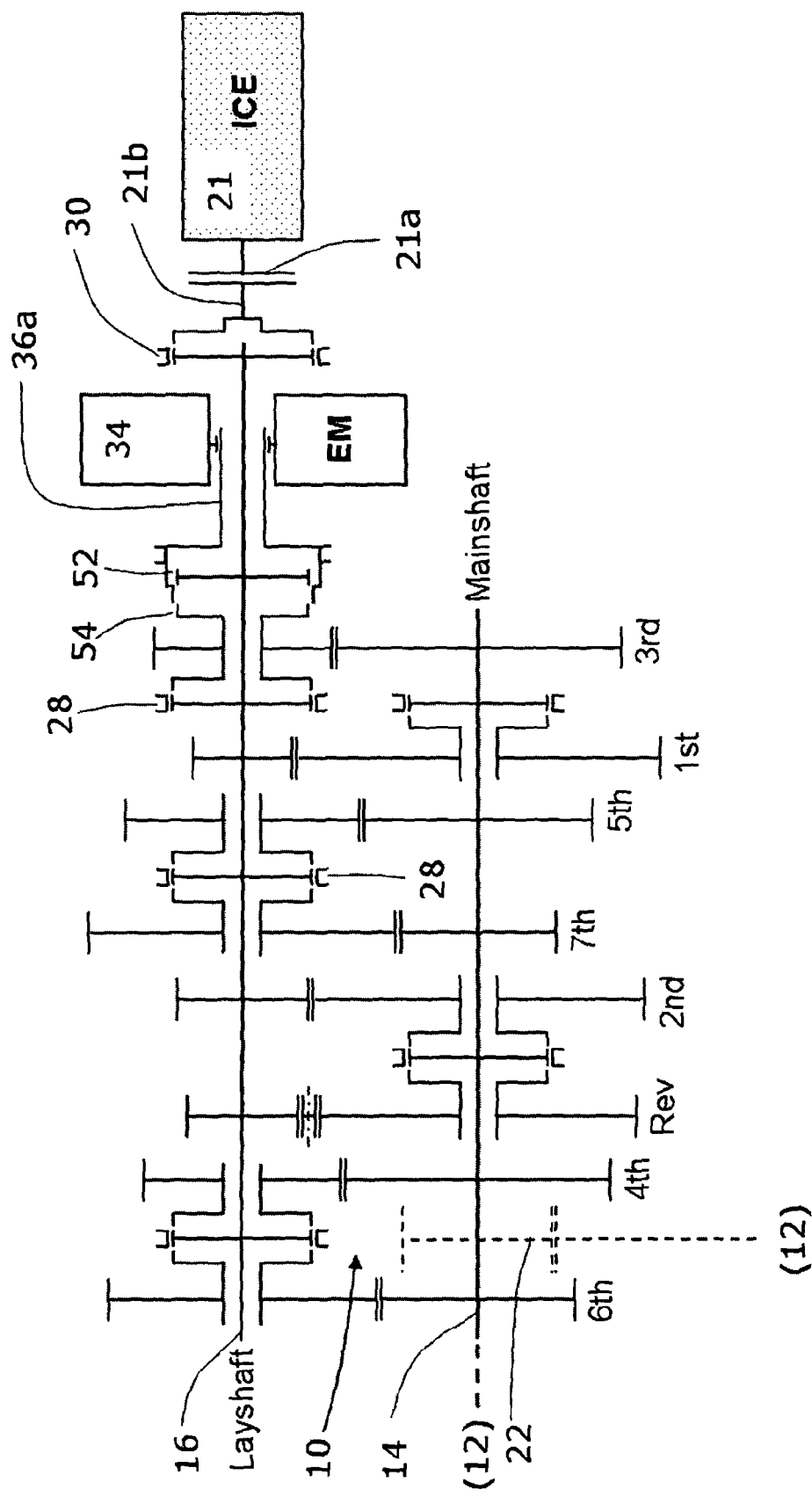

FIGS. 11 and 12 show alternative constructions of an embodiment that is essentially similar in operation to the embodiment of FIGS. 8 to 10. In these examples an in-line IC engine and gearbox are depicted rather than the transverse arrangement in FIGS. 8 to 10, and demonstrate two alternative mounting arrangements for the secondary electric motor. The principle components and mode of operation of this embodiment are the same as those of the embodiment of FIGS. 8 to 10, and will not be described further except to note that in FIG. 12 the electric motor input gear train 38,40,50 has been replaced by a coaxial drive sleeve 36a to connect to selectors 54 or 52. It will be noted that the order in which the seven gear trains are disposed on the mainshaft 14 and the layshaft 16 is different, but this does not affect the operation of the gearbox.

Figure 13:
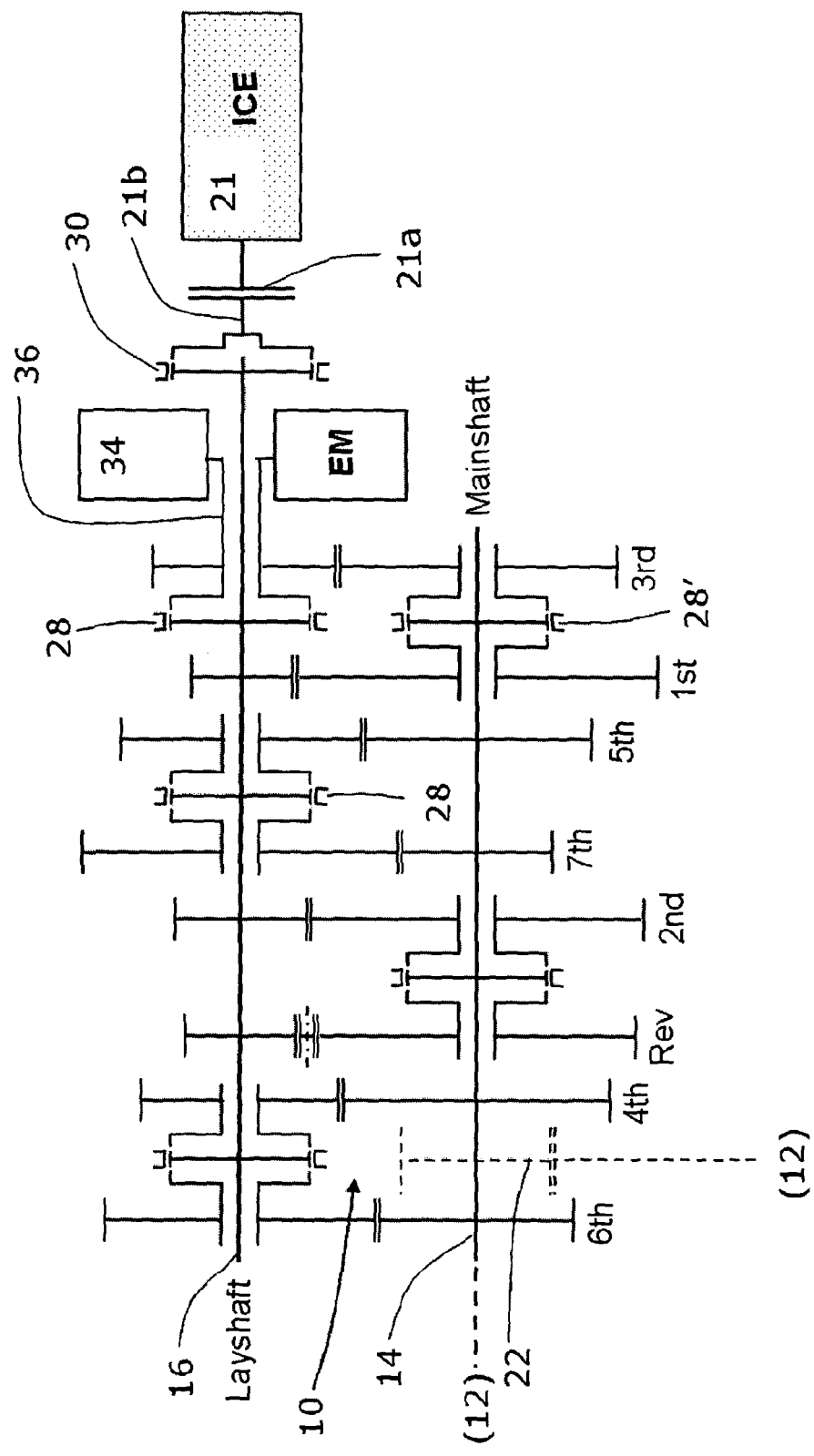
FIG. 13 shows diagrammatically the main components of an alternative transmission architecture utilising the same hybrid functionality as the third embodiment of the invention in FIGS. 5-7.

FIG. 13 shows the construction of an alternative embodiment that is essentially similar in operation to the embodiment of FIGS. 5 to 7, again for an in-line IC engine and gearbox architecture. The principle components and mode of operation of this embodiment are the same as those of the embodiment of FIGS. 5 to 7, and will not be described further except to note that in FIG. 13 the electric motor input gear train 38,40,50 has been replaced by a direct connection of the motor output shaft 36 to the layshaft gear of the $3^{rd}$ gear train.

The electric motor 34 can connected either to the layshaft 16 providing a "high-speed" selection, or to the gearbox output via the $3^{rd}$ gear, providing a "low-speed" selection. When the gearbox is in $3^{rd}$ gear the selection of the electric motor 34 can be changed from low-speed to high-speed or vice versa without the occupants of the vehicle noticing the change, since at that point the low and high speeds are the same.

Figure 14:
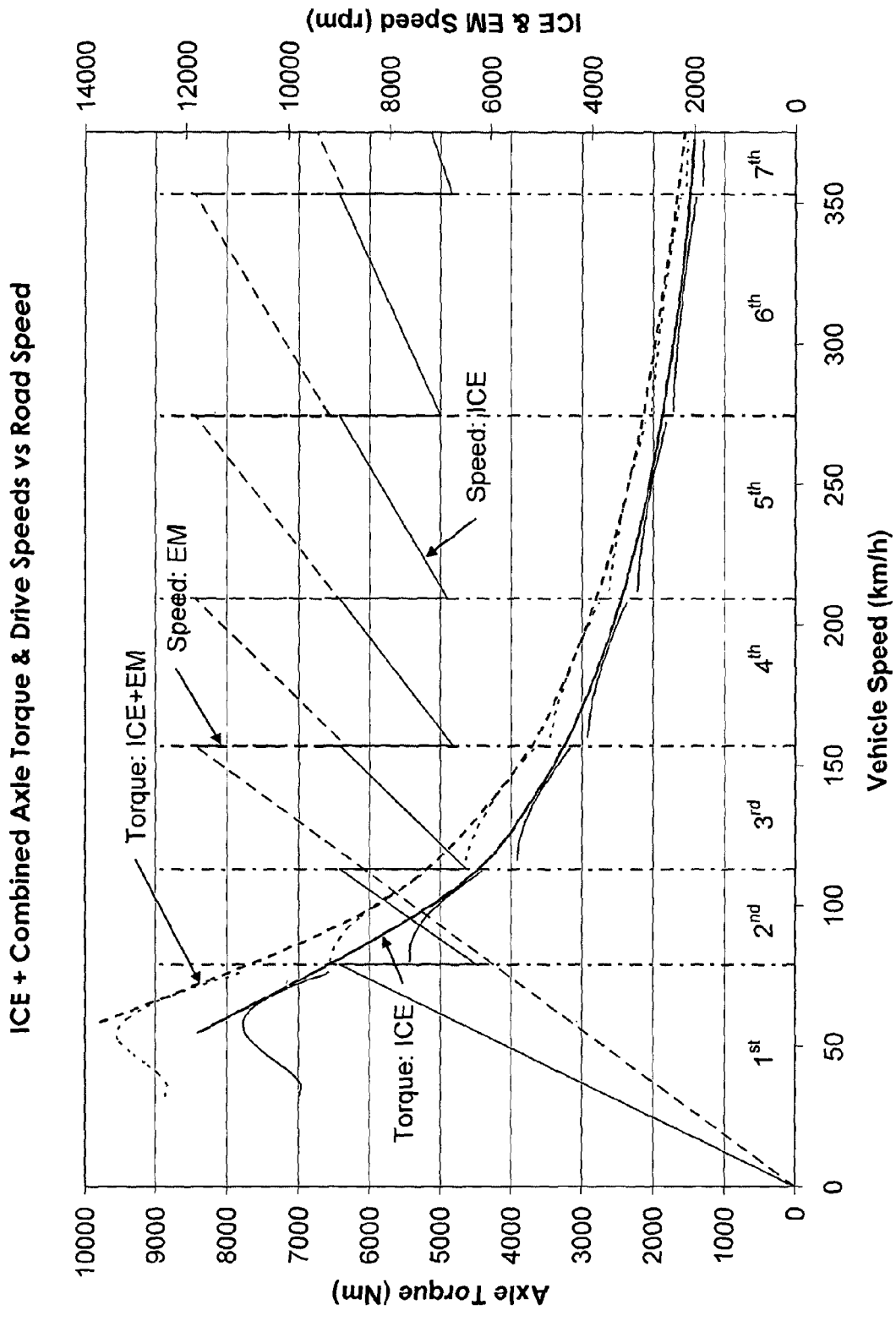
FIG. 14 is a graph that shows the torque delivered to a driving axle of a vehicle by the transmission system of FIG. 1.

FIG. 14 shows a typical speed v. axle torque graph for a vehicle equipped with a transmission system as described above. The line labelled "Speed: ICE" shows the speed of the IC engine v. the road speed of the vehicle, with each gearchange point, e.g. $1^{st}$ to $2^{nd}$ etc., shown. The graph also shows, in the line labelled "Speed: EM", the speed of the electric motor v. the speed of the vehicle.

The graph shows that the speed of the electric motor increases from rest to its maximum, which coincides with the gearbox change out of $3^{rd}$ gear into $4^{th}$ gear. The electric motor is connected to the gearbox output until this point, and at higher speeds it is connected to the gearbox input. The torque of the IC engine alone measured at the axle is shown in the dashed line labelled "Torque". The solid line labelled "Torque: ICE & E motor" shows the combined torque of the IC engine and the electric motor measured at the axle. It can be seen that there is a significant increase in the torque measured at the axle with the IC engine and electric motor combined, as compared to the torque of the IC engine alone. This increase is enhanced by the electric motor being initially connected to the gearbox output, and then to the gearbox input.

The invention claimed is:

1. A transmission system for a vehicle, the system comprising:
   a. a primary input shaft for receiving drive from a primary vehicle drive motor,
   b. a secondary input shaft for receiving drive from a secondary vehicle drive motor;
   c. an output shaft for connection to drive a final drive unit;
   d. a multi-speed gearbox that can connect the primary input shaft to the output shaft at one of a plurality of gear ratios; and
   e. input selection means including a drive train comprising an input shaft gear mounted on the primary input shaft, an output shaft gear mounted on the output shaft, a first selector hub for selectively connecting or disconnecting the input shaft gear and the primary input shaft, and a second selector hub for selectively connecting or disconnecting the output shaft gear and the output shaft;
   in which the input selection means, in a first mode, connects the secondary input shaft to the output shaft to transmit drive from the secondary vehicle drive motor to the final drive unit via the output shaft and, in a second mode, connects the secondary input shaft to the primary input shaft to transmit drive from the secondary vehicle drive motor to the final drive unit via the primary input shaft, the gearbox and the output shaft;
   further comprising a drive gear mounted on the primary input shaft for transmitting drive from the primary vehicle drive motor to the primary input shaft, and a selector clutch for selectively connecting or disconnecting the drive gear and the primary input shaft.

2. A transmission system according to claim 1 in which the input selection means operates by selectively connecting drive from the secondary input shaft to a first or a second gear train within the gearbox, each train having a gear on a mainshaft of the gearbox and a gear on a layshaft of the gearbox.

3. A transmission system according to claim 2 in which the first gear train is permanently connected for rotation with the mainshaft of the gearbox and the second gear train is permanently connected for rotation with the layshaft of the gearbox.

4. A transmission system according to claim 1 in which the input selection means operates by selectively connecting drive from the secondary input shaft to a gear train within the gearbox or to a layshaft of the gearbox, the gear train having a gear on a mainshaft of the gearbox and a gear on the layshaft of the gearbox.

5. A transmission system according to claim 1 in which the input selection means operates by selectively connecting drive from the secondary input shaft to a gear train within the gearbox or to a mainshaft of the gearbox, the gear train having a gear on a mainshaft of the gearbox and a gear on the layshaft of the gearbox.

6. A transmission system according to claim 4 in which each gear of the gear train can be selectively connected to or disconnected from its shaft of the gearbox.

7. A transmission system according to claim 4 in which drive from the secondary input shaft is passed to a through gear, which can be selectively connected to the layshaft of the gearbox or to a gear on the layshaft of the gear train of the gearbox.

8. A transmission system according to claim 4 in which drive from the secondary input shaft is passed to a through gear, which can be selectively connected to the mainshaft of the gearbox or to a gear on the mainshaft of the gear train of the gearbox.

9. A transmission system according to claim 1 in which the input selection means operates by selectively connecting drive from the secondary input shaft to a layshaft of the gearbox or to a layshaft gear of a gear train of the gearbox.

10. A transmission system according to claim 1 further including a clutch that can selectively connect the primary drive motor to the gearbox or disconnect the primary drive motor from the gearbox.

11. A transmission system according to claim 1 that operates with the selection means in the first mode when the gearbox is in neutral or in a low ratio, and in the second mode when the gearbox is in a high ratio.

12. A drive system for a vehicle, the drive system comprising:
   a transmission system comprising:
      a. a primary input shaft for receiving drive from a primary vehicle drive motor,
      b. a secondary input shaft for receiving drive from a secondary vehicle drive motor;
      c. an output shaft for connection to drive a final drive unit;
      d. a multi-speed gearbox that can connect the primary input shaft to the output shaft at one of a plurality of gear ratios; and e. input selection means including a drive train comprising an input shaft gear mounted on the primary input shaft, an output shaft gear mounted on the output shaft, a first selector hub for selectively connecting or disconnecting the input shaft gear and the primary input shaft, and a second selector hub for selectively connecting or disconnecting the output shaft gear and the output shaft;

in which the input selection means, in a first mode, connects the secondary input shaft to the output shaft to transmit drive from the secondary vehicle drive motor to the final drive unit via the output shaft and, in a second mode, connects the secondary input shaft to drive the primary input shaft to transmit drive from the secondary vehicle drive motor to the final drive unit via the primary input shaft, the gearbox and the output shaft;

further comprising a drive gear mounted on the primary input shaft for transmitting drive from the primary vehicle drive motor to the primary input shaft, and a selector clutch for selectively connecting or disconnecting the drive gear and the primary input shaft;

wherein the primary drive motor is connected to the primary input shaft, and the secondary drive motor is connected to the secondary input shaft.

13. A drive system according to claim 12 in which the primary drive motor is an internal combustion engine.

14. A drive system according to claim 13 in which the internal combustion engine is one of a compression ignition engine or a spark ignition engine.

15. A drive system according to claim 13 in which the secondary drive motor is an electric motor.

16. A drive system according to claim 15 further including a battery pack.

17. A drive system according to claim 16 further including charging means for the battery pack.

18. A drive system according to claim 17 operable during such time that there is no drive connection from the primary drive motor to the output shaft, to connect the primary drive motor to the charging means to cause it to charge the battery pack.

19. A transmission system according to claim 5 in which each gear of the gear train can be selectively connected to or disconnected from its shaft of the gearbox.

20. A transmission system according to claim 5 in which drive from the secondary input shaft is passed to a through gear, which can be selectively connected to the layshaft of the gearbox or to a gear on the layshaft of a gear train of the gearbox.

21. A transmission system according to claim 5 in which drive from the secondary input shaft is passed to a through gear, which can be selectively connected to the mainshaft of the gearbox or to a gear on the mainshaft of a gear train of the gearbox.

* * * * *